US006964090B2

(12) United States Patent

Mathieu et al.

(10) Patent No.: US 6,964,090 B2

(45) Date of Patent: Nov. 15, 2005

(54) ARM CONSTRUCTION FOR WAREWASH MACHINE AND METHOD OF MANUFACTURING

(75) Inventors: Raymond J. Mathieu, Troy, OH (US); Brian J. Bowers, St. Marys, OH (US); David L. Fischer, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 61 days.

(21) Appl. No.: 10/752,373

(22) Filed: Jan. 6, 2004

(65) Prior Publication Data

US 2005/0144773 A1 Jul. 7, 2005

(51) Int. Cl.$^{7}$ .......................... B23P 25/00; B23P 13/04; B08B 3/00

(52) U.S. Cl. ........................... 29/458; 29/557; 134/172

(58) Field of Search ............................ 29/458, 525.14, 29/525.13, 439, 440, 557; 134/172, 25.2, 134/180, 176, 179; 239/228, 251, 243

(56) References Cited

U.S. PATENT DOCUMENTS

| | | | | |
|---|---|---|---|---|
| 3,918,644 | A * | 11/1975 | Platt et al. | 239/243 |
| 3,941,139 | A * | 3/1976 | Spiegel | 134/176 |
| 4,210,285 | A * | 7/1980 | Dicken et al. | 239/251 |
| 4,418,868 | A * | 12/1983 | Gurubatham et al. | 239/228 |
| 5,267,582 | A | 12/1993 | Purtilo | |
| 5,464,482 | A | 11/1995 | Michael et al. | |
| 5,662,744 | A | 9/1997 | Tuller et al. | |

OTHER PUBLICATIONS

Hobart Catalog of Replacement Parts—Dishwashers—Form 19272—May 2000—48 pages.

* cited by examiner

*Primary Examiner*—John C. Hong

(74) *Attorney, Agent, or Firm*—Thompson Hine LLP

(57) ABSTRACT

A warewash machine arm includes a body formed of a single piece of sheet metal. Adjacent edge parts of the formed sheet metal mat be sealed, such as by a seam weld, an epoxy or another sealing technique.

25 Claims, 6 Drawing Sheets

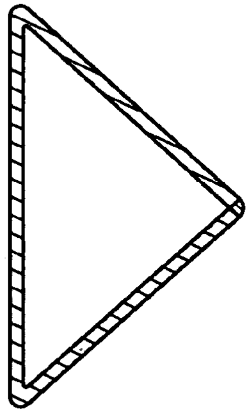
Fig. 3
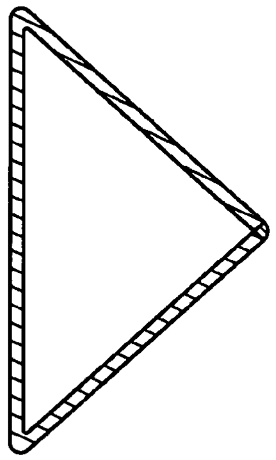
Fig. 4
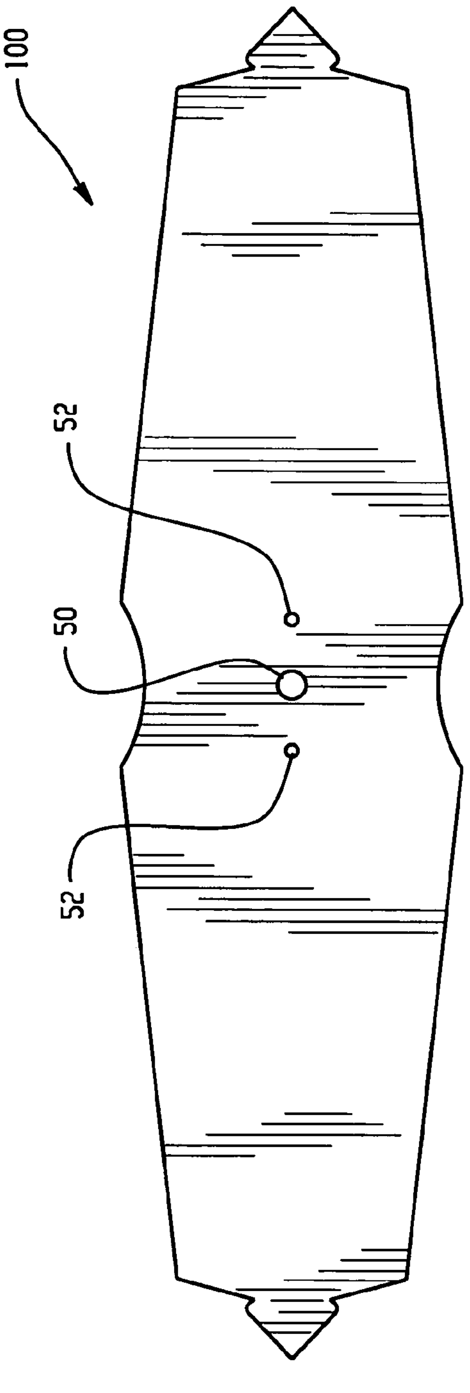
Fig. 5A
Fig. 5B

ARM CONSTRUCTION FOR WAREWASH MACHINE AND METHOD OF MANUFACTURING

TECHNICAL FIELD

The present application relates generally to machines used to wash kitchen wares such as dishes, glasses, utensils and pots and pans, and more particularly to a warewash arm construction for such machines.

BACKGROUND

Box-type warewash machines utilize rotating warewash arms to deliver liquid onto wares during the wash process. The warewash arms typically have a hollow body portion with nozzles either formed therein or attached thereto. Liquid is delivered into the hollow body portion and then exits through the nozzles for ejection onto the wares. In the past, the hollow body portion has been formed using multiple pieces. Cast warewash arms are also known, but cast arms tend to be heavier than desired.

Accordingly, it would be desirable to provide a warewash arm that is simpler and less expensive to manufacture, while at the same time providing greater reliability.

SUMMARY

In one aspect, a warewash machine arm for ejecting liquid in a warewash machine includes an arm body defined by a single piece of sheet metal formed to provide an elongated liquid space along an arm axis. Adjacent edge parts of the formed sheet metal are joined together to provide substantially sealed joints. The liquid space is defined in part by an orifice side of the formed piece of sheet metal and a mount opening is located in the arm body opposite the orifice side. Providing a wash arm body of a single piece of formed sheet metal facilitates reduced manufacturing costs, and providing weld joints at abutting edge parts of the formed sheet metal can create more reliable, longer lasting joints.

In another aspect, a method of manufacturing an arm body for a warewash machine arm assembly involves the steps of cutting a piece of sheet metal to produce a flat blank having a specified perimeter shape; forming a first hub part and a second hub part toward opposite sides of the flat blank; forming the flat blank into an enclosing configuration to define an elongated interior space, with the first hub part adjacent the second hub part; and sealing adjacent edge parts of the sheet metal when in the enclosing configuration. The method can reduce manufacturing costs as compared to multi-piece arm bodies.

BRIEF DESCRIPTION OF THE DRAWINGS

FIG. 3 is a cross-section taken along line 3—3 of FIG. 1;

FIG. 4 is a cross-section taken along line 4—4 of FIG. 1;

FIGS. 5A and 5B thru 9A and 9B depict one possible sequence of manufacturing of the arm body of FIG. 1.

DETAILED DESCRIPTION

Figure 1:
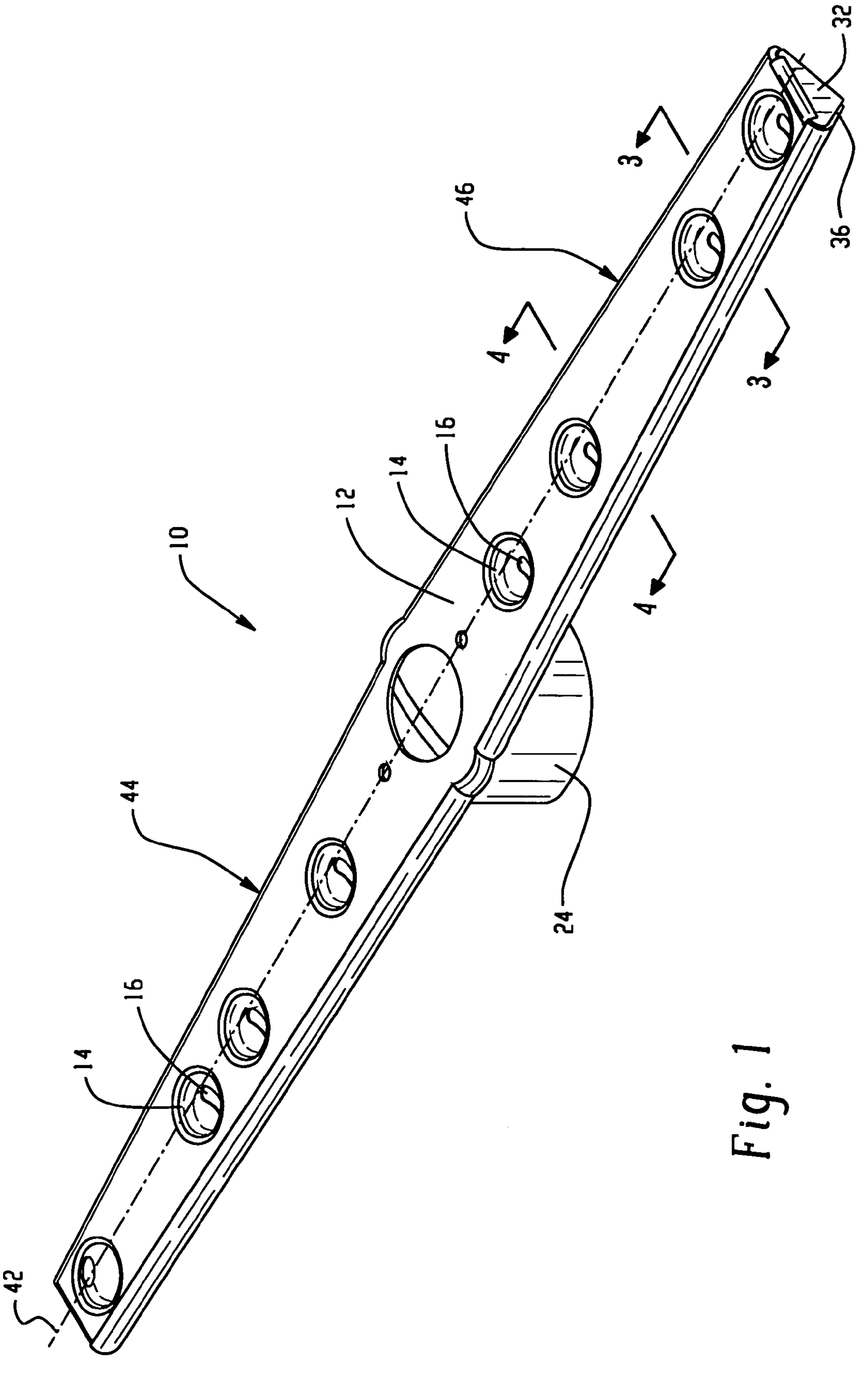
FIG. 1 is a top perspective of one embodiment of a warewash machine arm body.
Figure 2:
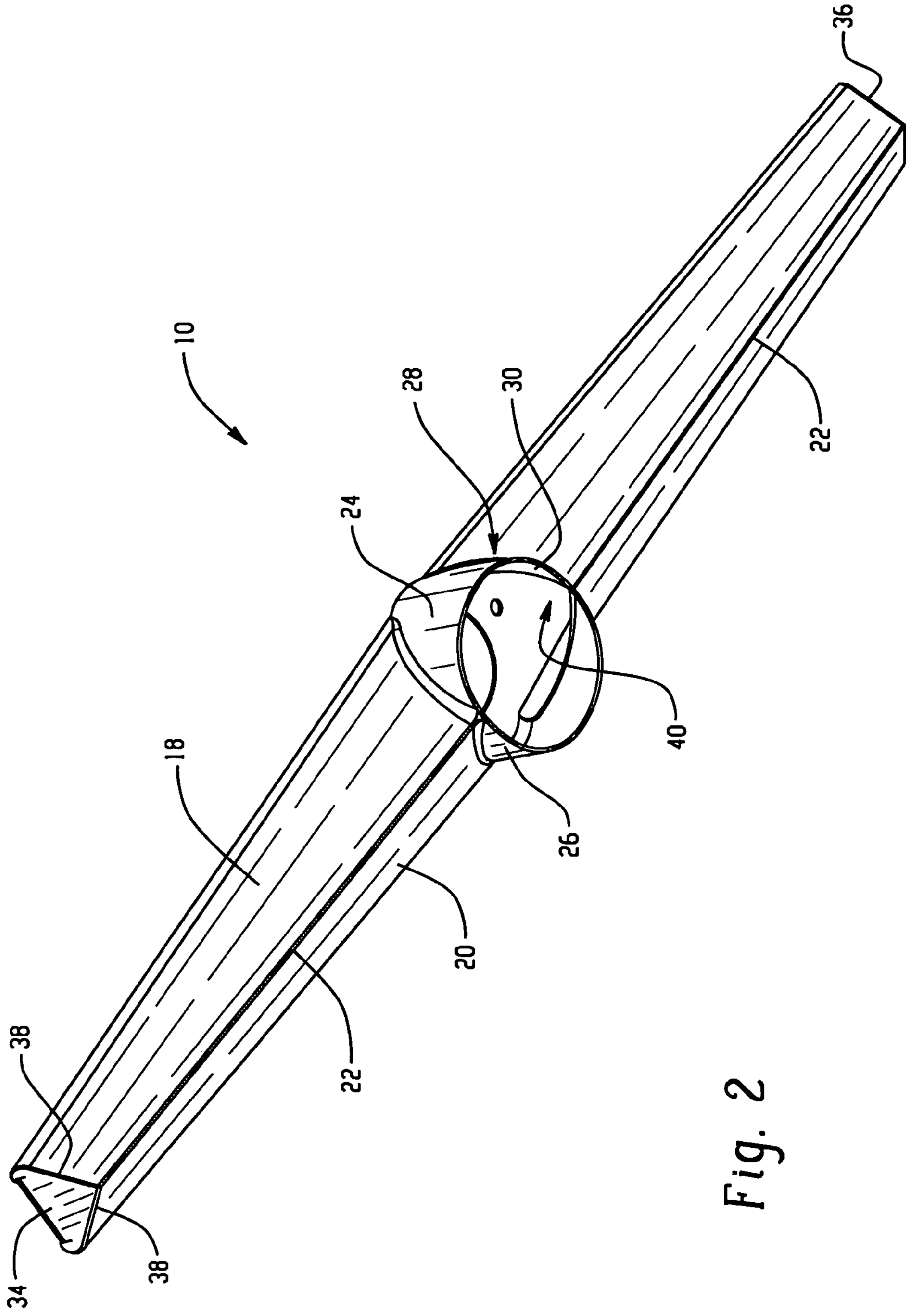
FIG. 2 is a bottom perspective of the arm of FIG. 1.
Figure 6A:
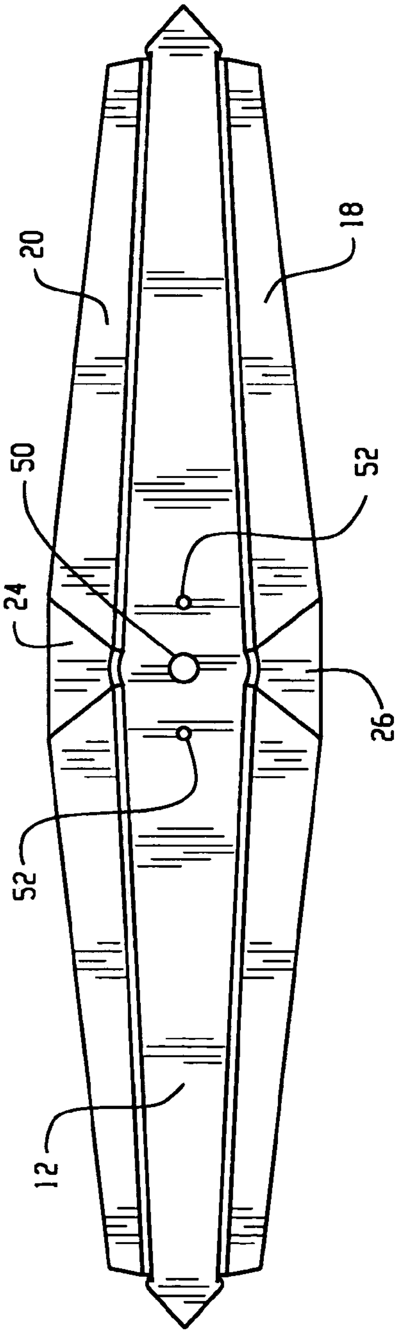
Figure 6B:
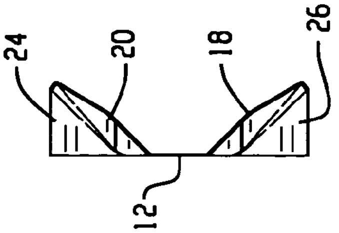
Figure 7A:
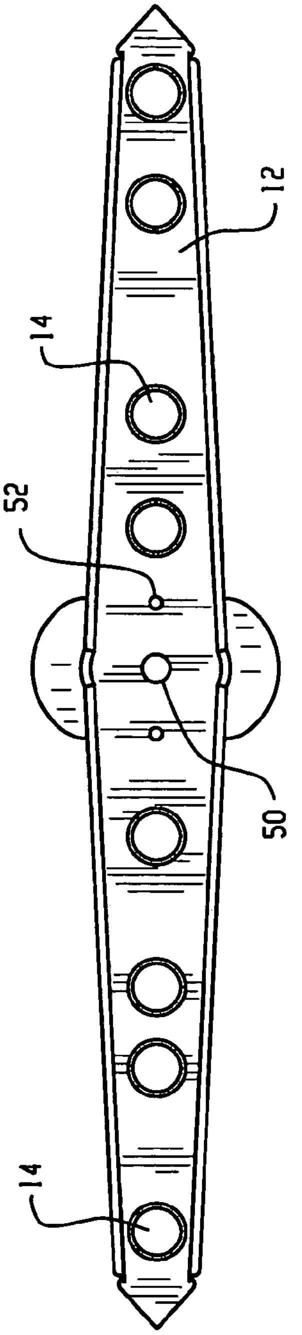
Figure 7B:
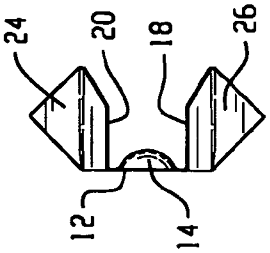
Figure 8B:
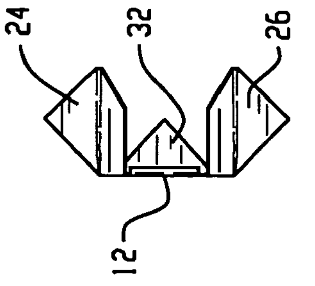
Figure 8A:
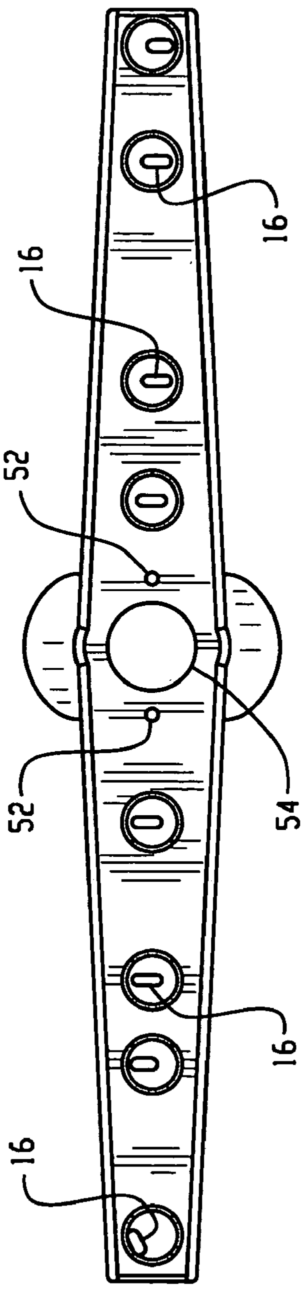

Referring to FIGS. 1 and 2, one embodiment of an arm body 10 for a warewash machine arm is shown. The arm body 10 is defined by a single piece of formed sheet metal. In particular, the single piece of sheet metal is formed to provide an orifice side 12 with multiple inwardly extending dimples 14 each having one or more orifice openings 16 therein. Placing the orifice openings 16 in the inwardly extending dimples helps avoid clogging of the orifice openings by food soils. Lower sides 18 and 20 are continuous with the orifice side 12 and bent downward so that edges of sides 18 and 20 abut along joints 22. In an alternative implementation the adjacent edges could overlap rather than abut. As used herein, the terms "lower" and "downward" are used with reference to the orifice side of the arm body as the upper or top side of the arm body, regardless of the physical orientation of the arm body when installed in a warewash machine. Each side 18 and 20 is also formed with a respective mount hub part 24 and 26. The mount hub parts 24 and 26 are positioned adjacent each other to form a mount hub 28 that defines a mount opening 30 of the arm body. End flaps 32 and 34 are also continuous with the orifice side 12 and bent downward to abut with end edges of the lower sides 18 and 20 at respective joints 36 and 38. Making the end flaps 32 and 34 continuous with the orifice side 12 provides greater strength at the ends of the arms enabling dimples 14 and associated orifices 16 to be located near the ends of the arms. Continuous welds are provided along joints 22, 36 and 38 to substantially seal the joints. The formed and welded sheet metal of the arm body 10 provides an elongated interior liquid space 40 that extends along an arm axis 42.

The resulting arm body configuration includes respective weld joints 22. Arm parts 44 and 46 are located on respective sides of the mount hub 30, which is preferably located centrally along the length of the arm body. As seen in the cross-sections of FIGS. 3 and 4, each of the arm parts 44 and 46 of the illustrated embodiment is substantially triangular in cross-section, and the size of the triangular cross-section of the arm parts 44 and 46 generally increases as the location where the cross-section is taken moves closer to the mount hub 28.

Figure 9B:
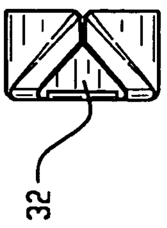
Figure 9A:
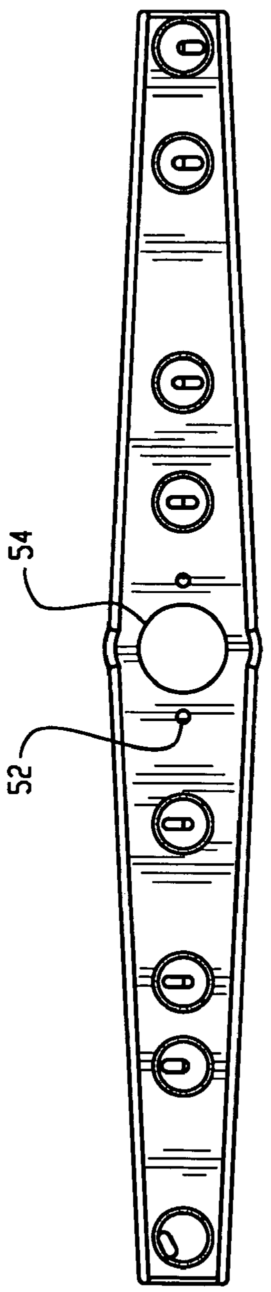

Referring now to FIGS. 5A and B thru FIGS. 9A and B, each pair of A and B figures shows a top view and end elevation respectively during the arm body manufacturing process. In this example a series of four dies are used to form a flat blank of sheet metal (such as stainless steel) shown in FIGS. 5A and B into the final arm body configuration shown in FIGS. 9A and B, as well as FIGS. 1 and 2. The flat blank 100 is first stamped or otherwise separated from a larger piece of sheet metal, and has a specific, predefined perimeter shape as shown in FIG. 5A. Central opening 50 and fastener openings 52 may be created at the same time the blank 100 is created. The blank 100 is moved into a first die in which hub parts 24 and 26 are formed, and sides 18 and 20 are taken to about 45° relative to orifice side 12. In a second die the hub parts 24 and 26 are moved to about 45° relative to the orifice side 12, sides 18 and 20 are taken to about 90° relative to orifice side 12 and the dimples 14 are formed. In a third die orifice slots 16 are created, end flaps 32 and 34 are moved to 90° relative to orifice side 12 and the central opening is enlarged to create opening 54 in orifice side 12. In a fourth and final die the sides 18 and 20 and hub parts 24 and 26 are moved together to form the enclosing configuration. The arm body is then placed in a weld fixture where abutting edges of the arm body are seam welded. In an alternative implementation, in place of the seam welding step, an epoxy could be applied to the joints for sealing purposes. In some applications a stainless steel tape applied to the joint might be used.

Figure 10:
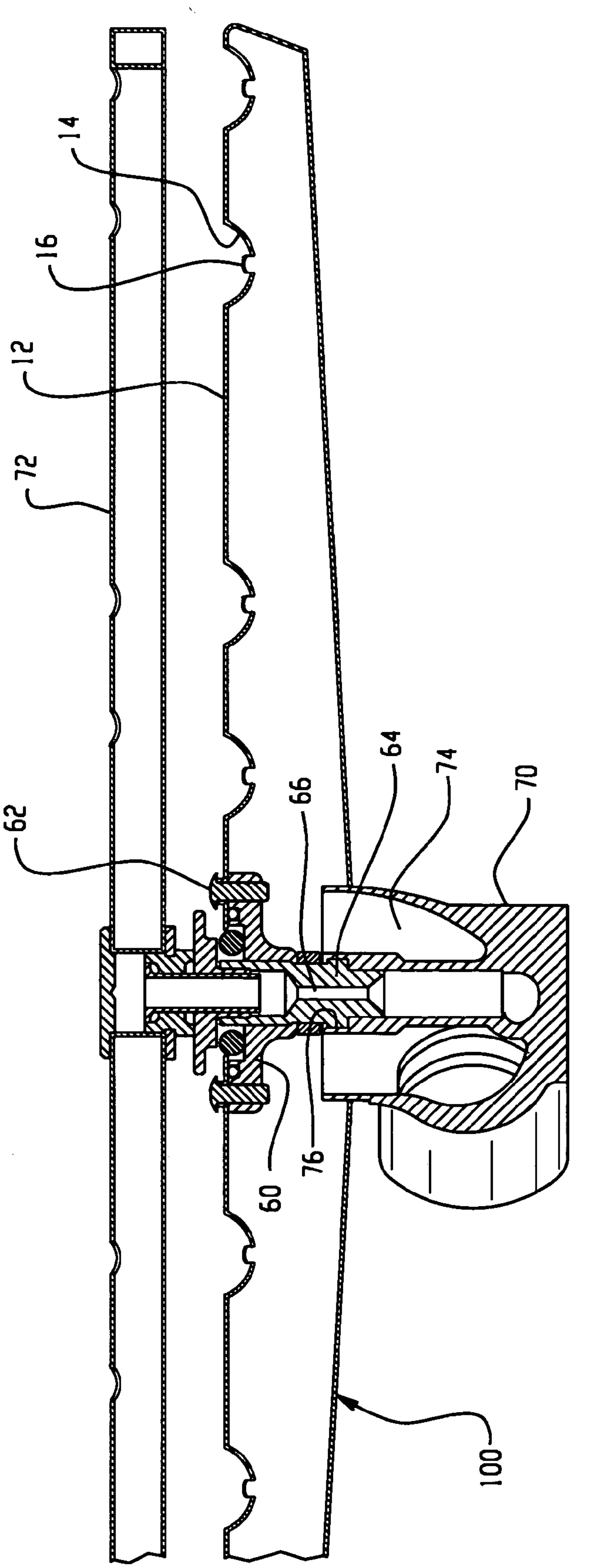
FIG. 10 is a cross-section of a warewash wash arm constructed using the arm body of FIG. 1 and mounted on a casting of a warewasher, with a corresponding rinse arm.

In one embodiment, referring to FIG. 10, a wash arm 100 is created by securing a mount assembly 60 to the arm body via fasteners 62 engaging fastener openings 52. A portion 64 of the mount assembly 60 extends toward the opening defined by hub parts 24 and 26. Portion 64 includes a fluid passage 66 such that when installed on a warewasher liquid supply casting 70 the passage 66 can receive liquid for delivery to a rinse arm 72 mounted above the wash arm. Portion 64 rests in an opening 76 of the casting and the wash arm 100 is thus supported by the casting 70. The interior of the wash arm 100 receives liquid via passage 74 of the casting 70. Notably, the wash arm 100 is mounted to rotate relative to the casting 70 as the wash arm 100 ejects liquid.

It is to be clearly understood that the above description is intended by way of illustration and example only and is not intended to be taken by way of limitation. For example, while the arm body described herein is primarily contemplated for use in connection with a wash arm, such a configuration could be utilized in connection with a rinse arm. As used herein the term "warewash machine arm" encompasses both wash arms and rinse arms. Further, while in the illustrated embodiment the sheet metal is formed so that a primary seam is located at the lower edge of the arm body where sides 18 and 20 abut, in an alternative configuration the primary seam could be located at one edge of the orifice side of the arm body. Other changes and modifications could be made, including both narrowing and broadening variations of the previously described embodiments and examples.

What is claimed is:

1. A warewash machine arm for ejecting liquid in a warewash machine, the arm comprising:

an arm body defined by a single piece of sheet metal formed to provide an elongated liquid space along an arm axis, with adjacent edge parts of the formed sheet metal joined together to provide substantially sealed joints, wherein the liquid space is defined in part by an orifice side of the formed piece of sheet metal and a mount opening is located in the arm body opposite the orifice side.

2. The warewash machine arm of claim 1 wherein a first part of the arm body is located to one side of the mount opening along the arm axis and a second part of the arm body is located to an opposite side of the mount opening along the arm axis.

3. The warewash machine arm of claim 2 wherein the first part is substantially triangular in cross section and the second part is substantially triangular in cross-section.

4. The warewash machine arm of claim 1, further comprising:

a mount assembly within the liquid space and extending from the orifice side of the formed piece of sheet metal toward the mount opening.

5. A warewash machine including the warewash machine arm of claim 4 mounted within a wash chamber.

6. The warewash machine arm of claim 1 wherein the formed piece of sheet metal includes first and second lower sides continuous with the orifice side and extending from opposite edges of the orifice side toward each other and welded together along a joint, the first and second lower sides including respective curved mount portions that are positioned proximate each other to form a mounting hub that defines the mount opening.

7. The warewash machine arm of claim 6 wherein the formed piece of sheet metal further includes a first end flap continuous with and bent downward from the orifice side and welded to a first end edge of the first lower side and a first end edge of the second lower side, and a second end flap continuous with and bent downward from the orifice side and welded to a second end edge of the first lower side and a second end edge of the second lower side.

8. The warewash machine arm of claim 1 wherein adjacent edge parts abut each other and are welded together to provide substantially sealed joints.

9. The warewash machine arm of claim 1 wherein an epoxy is applied to adjacent edge parts to provide substantially sealed joints.

10. A warewash machine arm for ejecting liquid in a warewash machine, comprising:

an arm body including an elongated interior space extending along an arm axis and defined by a single piece of formed sheet metal that also defines a mount opening, a first weld joint located to one side of the mount opening and joining edge parts of the single piece of formed sheet metal, and a second weld joint located to an opposite side of the mount opening and joining edge parts of the single piece of sheet metal, at least one side of the single piece of formed sheet metal including a plurality of orifice openings.

11. The warewash machine arm of claim 10 wherein the formed sheet metal to the one side of the mount opening is substantially triangular in cross section and the formed sheet metal to the opposite side of the mount opening is substantially triangular in cross section.

12. The warewash machine arm of claim 10, further comprising:

a mount assembly within the interior space and extending toward the mount opening.

13. The warewash machine arm of claim 12 wherein the mount assembly includes a part that protrudes from the mount opening.

14. A warewash machine including the warewash machine arm of claim 12 mounted within a wash chamber.

15. A warewash machine arm, comprising:

an arm body defined by a single piece of sheet metal formed to provide an elongated interior space along an arm axis, the interior space defined in part by an orifice side of the formed sheet metal and first and second lower sides of the formed sheet metal, the first and second lower sides continuous with and extending from opposite edges of the orifice side toward each other and connected together along a joint.

16. The warewash machine arm of claim 15 wherein the first and second lower sides include respective curved mount portions that are positioned proximate each other to form a mounting hub of the wash arm body, with a first arm body part to one side of the mounting hub along the arm axis and a second arm body part to an opposite side of the mounting hub along the arm axis.

17. The warewash machine arm of claim 15 further including a first end flap continuous with and bent downward from the orifice side and connected to a first end edge of the first lower side and a first end edge of the second lower side, and a second end flap continuous with and bent downward from the orifice side and connected to a second end edge of the first lower side and a second end edge of the second lower side.

18. The warewash machine arm of claim 15 wherein the joint is a welded abutment joint.

19. The warewash machine arm of claim 15 wherein the joint is sealed by an epoxy.

20. A warewash machine including the warewash machine arm of claim 15 mounted within a wash chamber.

21. A method of manufacturing an arm body for a warewash machine arm assembly, the method comprising:

cutting a piece of sheet metal to produce a flat blank having a specified perimeter shape;

forming a first hub part and a second hub part toward opposite sides of the flat blank;

forming the flat blank into an enclosing configuration to define an elongated interior space, with the first hub part adjacent the second hub part;

sealing adjacent edge parts of the sheet metal when in the enclosing configuration.

22. The method of claim 21, comprising the further step of:

creating a plurality of openings in the sheet metal to act as orifices.

23. The method of claim 21 comprising the further step of forming a plurality of dimples in the sheet metal, and the openings are created in the dimples.

24. The method of claim 21 wherein the sealing step involves seam welding.

25. The method of claim 21 wherein the sealing step involves application of an epoxy.

* * * * *